(12) United States Patent
Ignatius et al.

(10) Patent No.: US 11,531,166 B2
(45) Date of Patent: Dec. 20, 2022

(54) OPTICAL CONNECTOR ASSEMBLIES, OPTICAL RECEPTACLE ASSEMBLIES AND OPTICAL CONNECTION SYSTEMS HAVING MULTIPLE OPTICAL FIBERS

(71) Applicant: Corning Research & Development Corporation, Corning, NY (US)

(72) Inventors: Eric Ignatius, Frankfurt (DE); Michael Wimmer, Berlin (DE)

(73) Assignee: Corning Research & Development Corporation, Corning, NY (US)

( * ) Notice: Subject to any disclaimer, the term of this patent is extended or adjusted under 35 U.S.C. 154(b) by 226 days.

(21) Appl. No.: 16/860,509

(22) Filed: Apr. 28, 2020

(65) Prior Publication Data
US 2020/0341215 A1 Oct. 29, 2020

Related U.S. Application Data

(60) Provisional application No. 62/840,085, filed on Apr. 29, 2019.

(51) Int. Cl.
*G02B 6/38* (2006.01)
*G02B 6/40* (2006.01)

(52) U.S. Cl.
CPC ........... *G02B 6/3825* (2013.01); *G02B 6/387* (2013.01); *G02B 6/3883* (2013.01);
(Continued)

(58) Field of Classification Search
None
See application file for complete search history.

(56) References Cited

U.S. PATENT DOCUMENTS

| 7,090,406 B2 | 8/2006 | Melton et al. |
| 7,244,066 B2 | 7/2007 | Theuerkorn |

(Continued)

FOREIGN PATENT DOCUMENTS

| CN | 102870023 A | 1/2013 |
| JP | 2008-120072 A | 5/2008 |

(Continued)

OTHER PUBLICATIONS

Flockett; "Smallest Rugged Fibre Optic Connector Launched"; Electronic Specifier; 4 Pages; May 1, 2018.
(Continued)

*Primary Examiner* — Chad H Smith
(74) *Attorney, Agent, or Firm* — Michael E. Carroll, Jr.

(57) ABSTRACT

Optical connection systems, optical cable assemblies, and optical receptacle assemblies for optically coupling multiple optical fibers are disclosed. In one embodiment, an optical receptacle assembly includes a receptacle housing, wherein the receptacle housing defines a receptacle passage, and an adapter sleeve disposed within the receptacle passage of the receptacle housing. The adapter sleeve includes a sleeve passage and a sleeve inner threaded surface. The optical receptacle assembly further includes an adapter housing disposed within the receptacle passage having a first connector opening and a second connector opening, a first receptacle optical connector and a second receptacle optical connector. The first receptacle optical connector is disposed within the first connector opening of the adapter housing and the second receptacle optical connector is disposed within the second connector opening of the adapter housing.

24 Claims, 15 Drawing Sheets

(52) U.S. Cl.
CPC .......... *G02B 6/3893* (2013.01); *G02B 6/406* (2013.01); *G02B 6/3889* (2013.01); *G02B 6/38875* (2021.05)

(56) References Cited

U.S. PATENT DOCUMENTS

| | | |
|---|---|---|
| 7,771,039 B2 | 8/2010 | Sakagami |
| 9,069,151 B2 | 6/2015 | Conner |
| 9,829,653 B1 | 11/2017 | Nishiguchi et al. |
| 9,864,156 B1 | 1/2018 | Menguy |
| 10,133,011 B2 | 11/2018 | Huang et al. |
| 2004/0223699 A1 | 11/2004 | Melton et al. |
| 2008/0050070 A1* | 2/2008 | Gurreri ............... G02B 6/3891 385/55 |
| 2009/0148101 A1 | 6/2009 | Lu et al. |
| 2011/0075971 A1 | 3/2011 | Elenbaas et al. |
| 2013/0322828 A1 | 12/2013 | Busse et al. |
| 2016/0004018 A1 | 1/2016 | Lu et al. |
| 2017/0227719 A1 | 8/2017 | Zimmel et al. |
| 2017/0365962 A1 | 12/2017 | Gniadek |

FOREIGN PATENT DOCUMENTS

| | | | |
|---|---|---|---|
| WO | 2006/022840 A1 | 3/2006 | |
| WO | WO-2011003693 A1 * | 1/2011 | .......... G02B 6/3879 |
| WO | 2018/002743 A2 | 1/2018 | |

OTHER PUBLICATIONS

IEC International Standard; "Fibre Optic Interconnecting Devices and Passive Components—Fiber Optic Connector Interfaces—Part 34: Type URM Connector Family"; IEC 61754-34 (Sep. 2016); https://www.vde-verlag.de/iec-normen/preview-pdf/info_iec61754-34%7Bed1.0%7Db.pdf.

EUROMICRON® GMBH; Accessed Oct. 22, 2019; 3 Pages; http://en.euromicron-fiberoptic.com/.

Harting Technology Group; Accessed Oct. 22, 19; 5 Pages; http://www.harting.com/fileadmin/harting/documents/public/catalogue/10_7475_pushpull_e.pdf.

Prysmian Group; Linking the Future; Accessed Oct. 21, 19; 4 Pages; http://nl.prysmiangroup.com/nl/business_markets/markets/telecom-solutions/solutions/xsnet-fttx-solutions/indoor-solutions/jetnetxs/pre-connectorized-cables/.

Bulgin, Super Fast. Reliable. Connections.; Accessed Oct. 21, 2019; 7 Pages https://www.bulgin.com/.

* cited by examiner

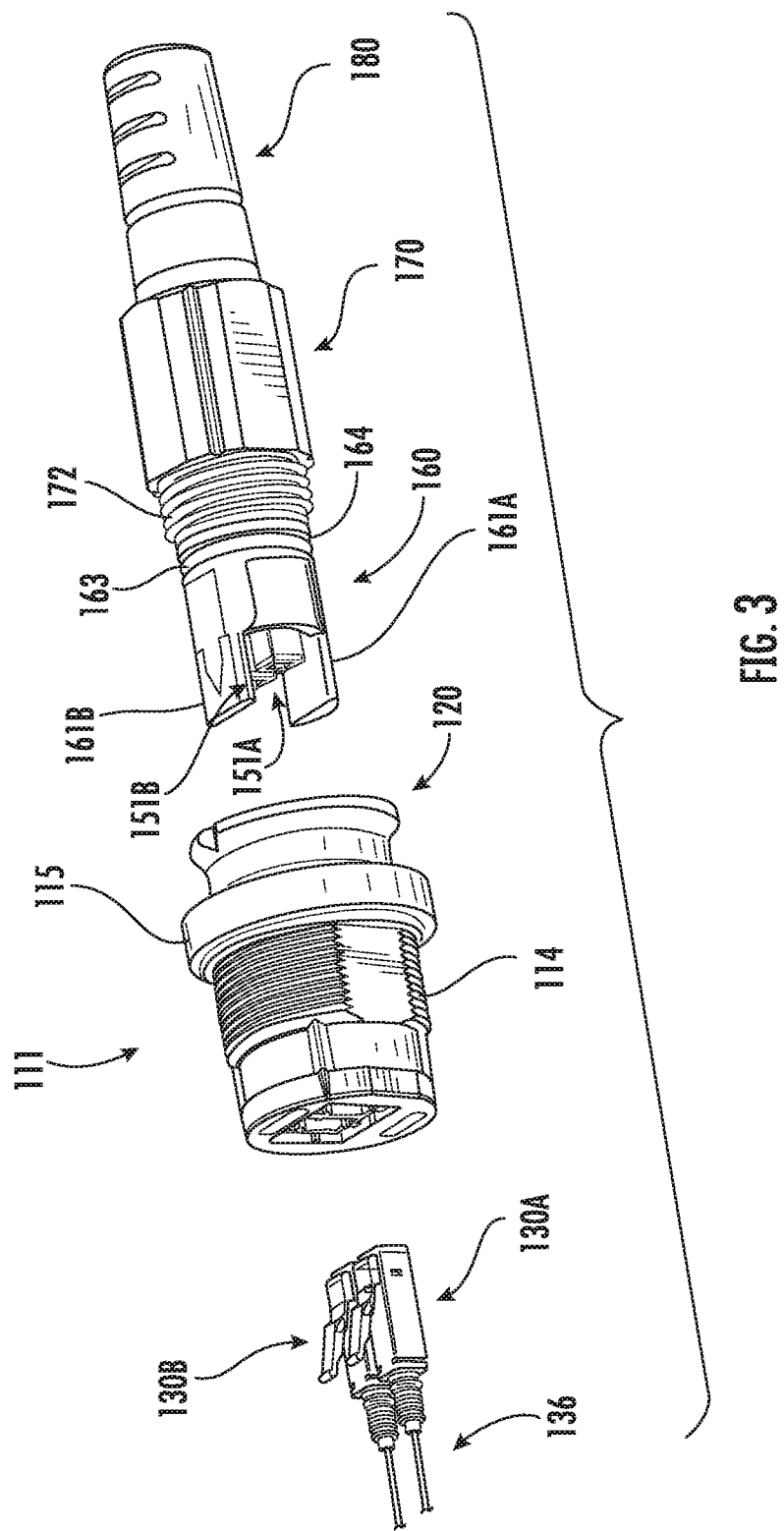

OPTICAL CONNECTOR ASSEMBLIES, OPTICAL RECEPTACLE ASSEMBLIES AND OPTICAL CONNECTION SYSTEMS HAVING MULTIPLE OPTICAL FIBERS

RELATED APPLICATIONS

This application claims the benefit of priority under 35 U.S.C. § 119 of U.S. Provisional Application Ser. No. 62/840,085 filed on Apr. 29, 2019, the content of which is relied upon and incorporated herein by reference in its entirety.

BACKGROUND

The present disclosure generally relates to high-bandwidth optical communication and, more particularly, to optical connectors and optical cable assemblies for use in optical networks that deliver multiple fibers to a premise.

Communication networks are used to transport a variety of signals such as voice, video, data transmission, and the like. Traditional communication networks use copper wires in cables for transporting information and data. However, copper cables have drawbacks because they are large, heavy, and can only transmit a relatively limited amount of data. On the other hand, an optical waveguide is capable of transmitting an extremely large amount of bandwidth compared with a copper conductor. Moreover, an optical waveguide cable is much lighter and smaller compared with a copper cable having the same bandwidth capacity. Consequently, optical waveguide cables replaced most of the copper cables in long-haul communication network links, thereby providing greater bandwidth capacity for long-haul links. However, many of these long-haul links have bandwidth capacity that is not being used. This is due in part to communication networks that use copper cables for distribution and/or drop links on the subscriber side of the central office. In other words, subscribers have a limited amount of available bandwidth due to the constraints of copper cables in the communication network. Stated another way, the copper cables are a bottleneck that inhibit the subscriber from utilizing the relatively high-bandwidth capacity of the long-hauls links.

Optical cables used as a drop link to a subscriber include only a single optical fiber, which has several disadvantages, such as reduced data capacity, lack of redundancy and the like.

SUMMARY

In one embodiment, an optical receptacle assembly includes a receptacle housing, wherein the receptacle housing defines a receptacle passage, and an adapter sleeve disposed within the receptacle passage of the receptacle housing. The adapter sleeve includes a sleeve passage and a sleeve inner threaded surface. The optical receptacle assembly further includes an adapter housing disposed within the receptacle passage having a first connector opening and a second connector opening, a first receptacle optical connector and a second receptacle optical connector. The first receptacle optical connector is disposed within the first connector opening of the adapter housing and the second receptacle optical connector is disposed within the second connector opening of the adapter housing.

In another embodiment, an optical connection system includes an optical receptacle assembly and an optical plug connector assembly. The optical receptacle assembly includes a receptacle housing, wherein the receptacle housing defines a receptacle passage, and an adapter sleeve disposed within the receptacle passage of the receptacle housing. The adapter sleeve has a sleeve passage and a sleeve inner threaded surface. The optical receptacle assembly further includes an adapter housing disposed within the receptacle passage including a first connector opening and a second connector opening, a first receptacle optical connector, and a second receptacle optical connector. The first receptacle optical connector is disposed within the first connector opening of the adapter housing and the second receptacle optical connector is disposed within the second connector opening of the adapter housing. The optical plug connector assembly includes a shroud defining a shroud passage and having an outer coupling surface and a coupling nut having a threaded outer surface and a coupling nut passage. The outer coupling surface of the shroud is disposed within the coupling nut passage such that the coupling nut is configured to rotate about the outer coupling surface of the shroud. The threaded outer surface of the coupling nut is configured to threadably engage the sleeve inner threaded surface of the adapter sleeve. The optical plug connector assembly further includes a connector housing having a first plug connector opening and a second plug connector opening, wherein the connector housing is disposed within the shroud passage. The optical plug connector assembly also includes a first plug optical connector and a second plug optical connector. The first plug optical connector is disposed within the first plug connector opening and the second plug optical connector is disposed within the second plug connector opening.

In another embodiment, an optical cable assembly includes a connector housing, wherein the connector housing defines a passage, and an adapter housing disposed within the passage. The adapter housing has a first connector opening and a second connector opening. The optical cable assembly further includes a first cable optical connector and a second cable optical connector. The first cable optical connector is disposed within the first connector opening of the adapter housing and the second cable optical connector is disposed within the second connector opening of the adapter housing.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description explain principles and operation of the various embodiments.

Figure 1:
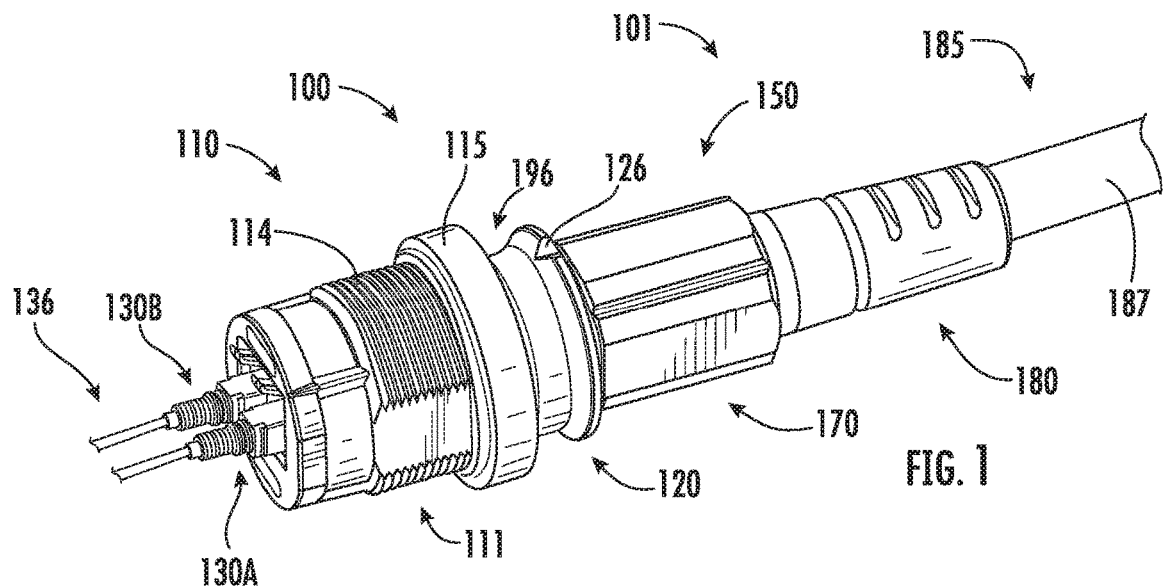
FIG. 1 schematically depicts an example optical connection system comprising an optical receptacle assembly mated to an optical plug connector assembly of an optical cable assembly according to one or more embodiments described and illustrated herein.
Figure 4A:
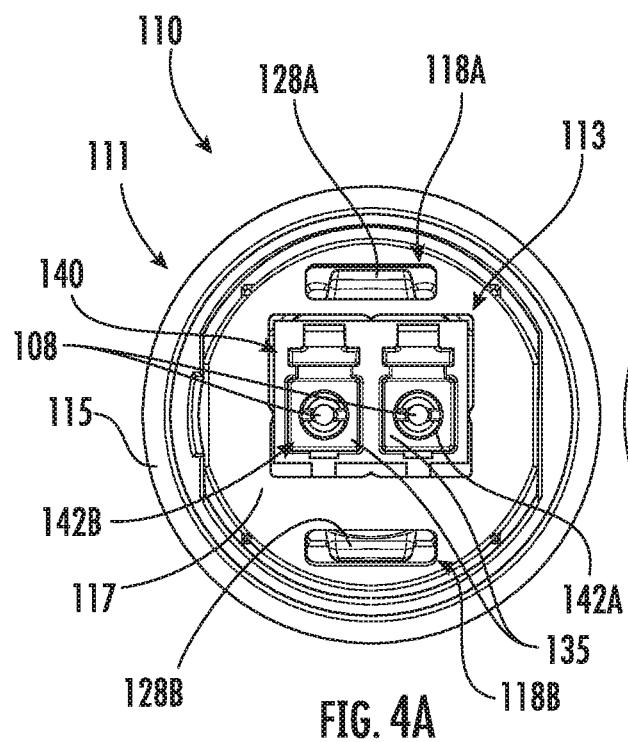
Figure 4B:
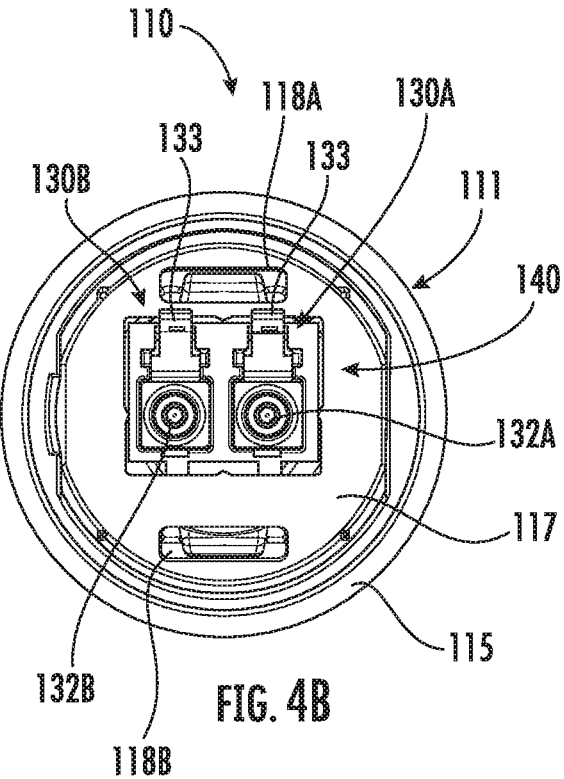
Figure 5A:
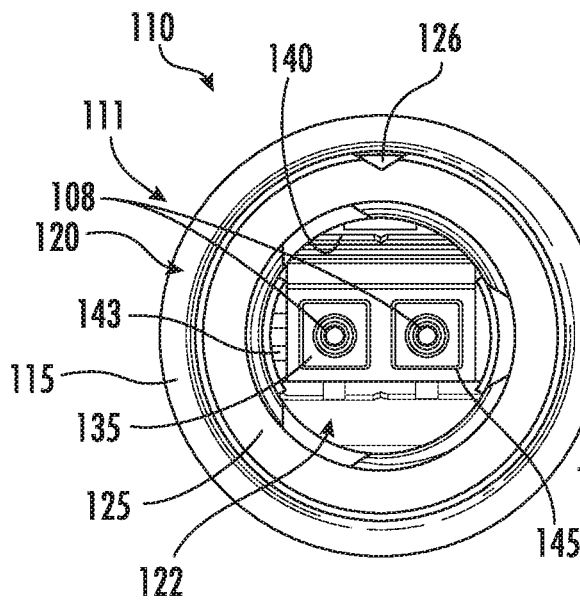
Figure 5B:
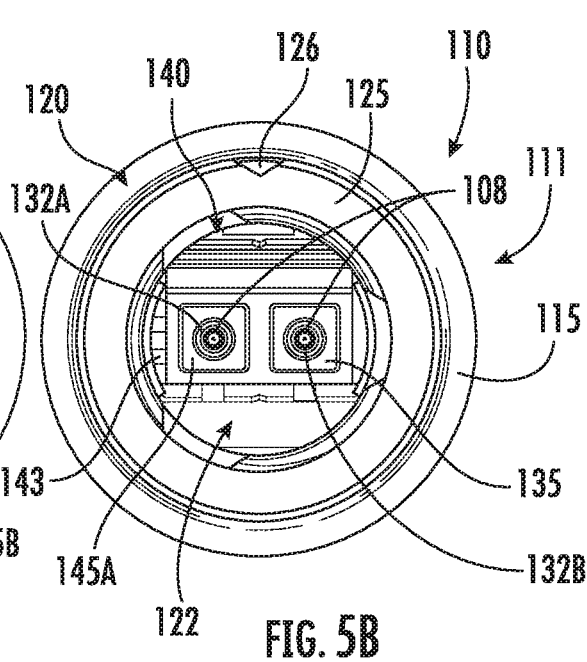
Figure 6A:
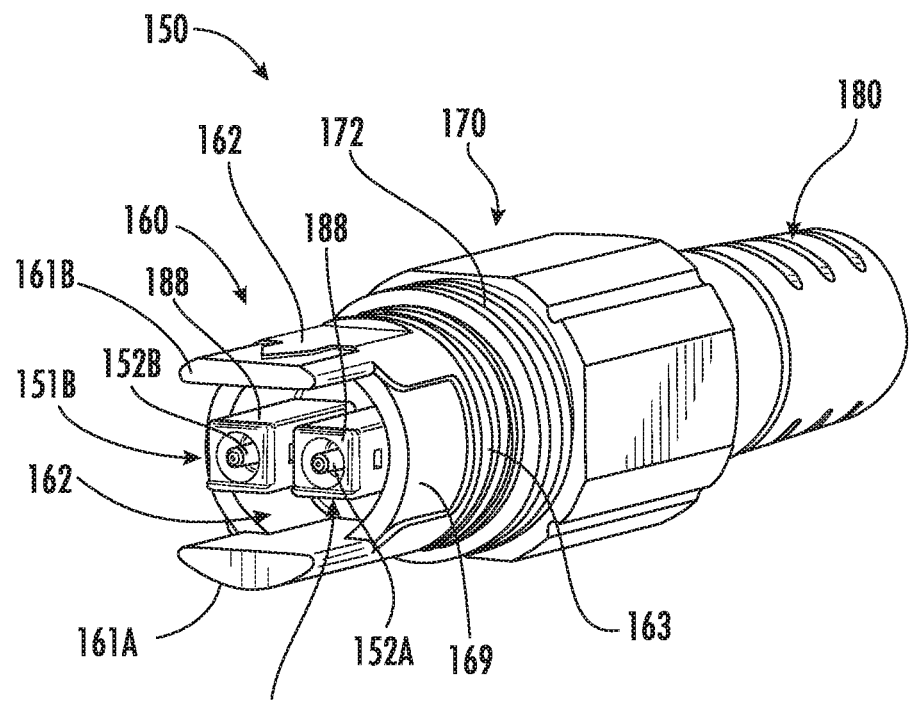
Figure 6B:
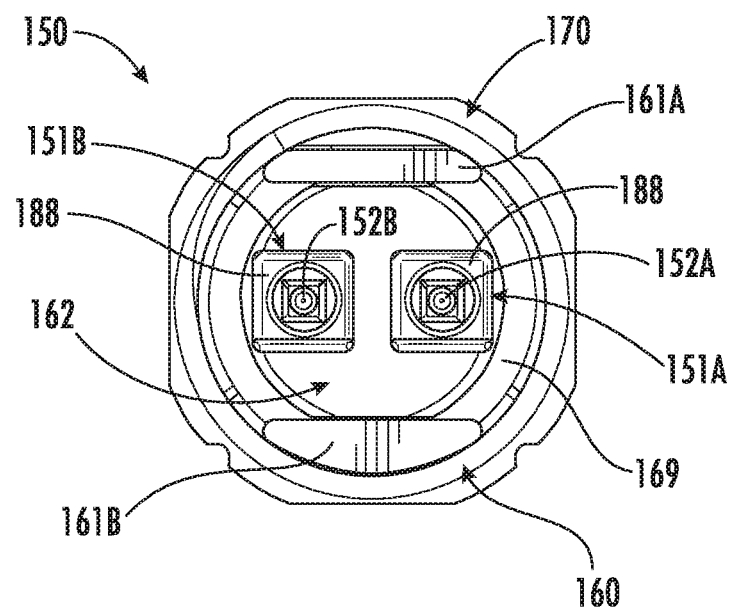
Figure 7A:
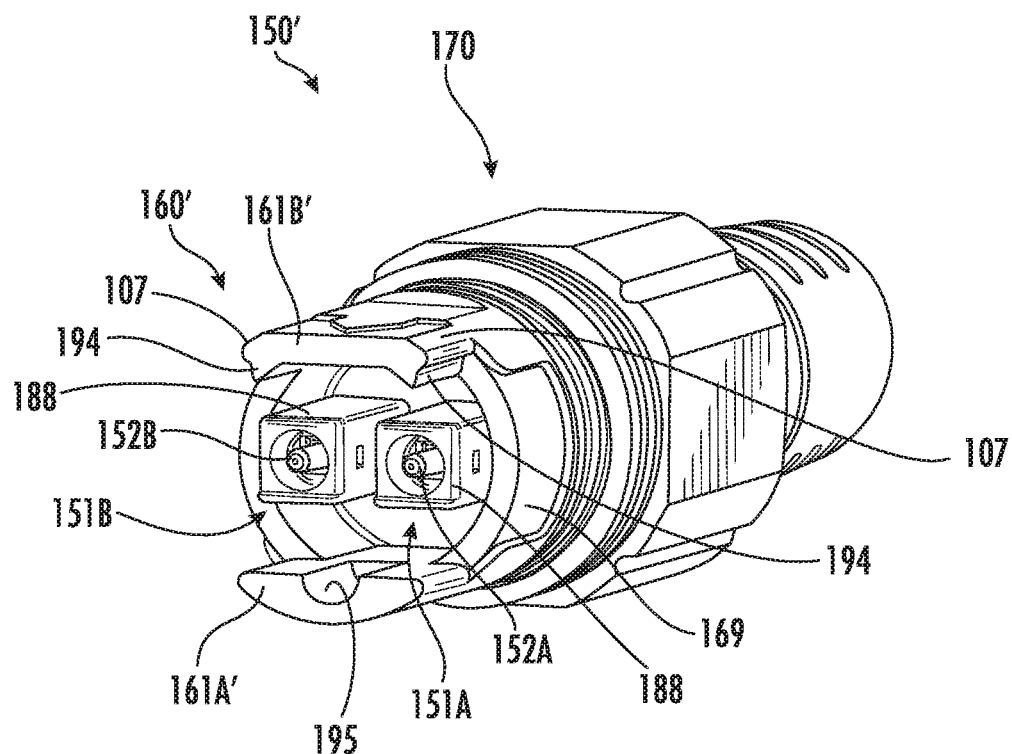
Figure 7B:
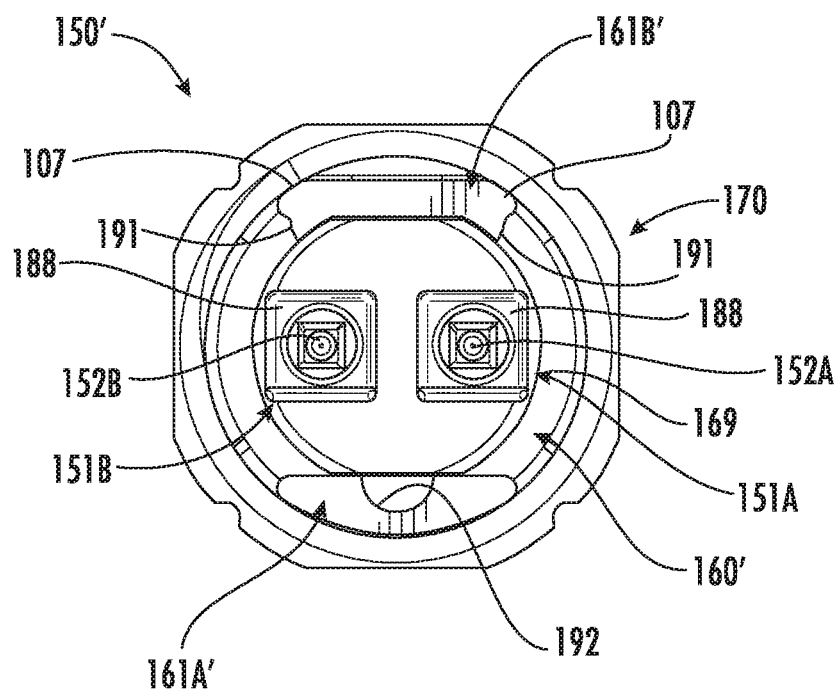
Figure 7C:
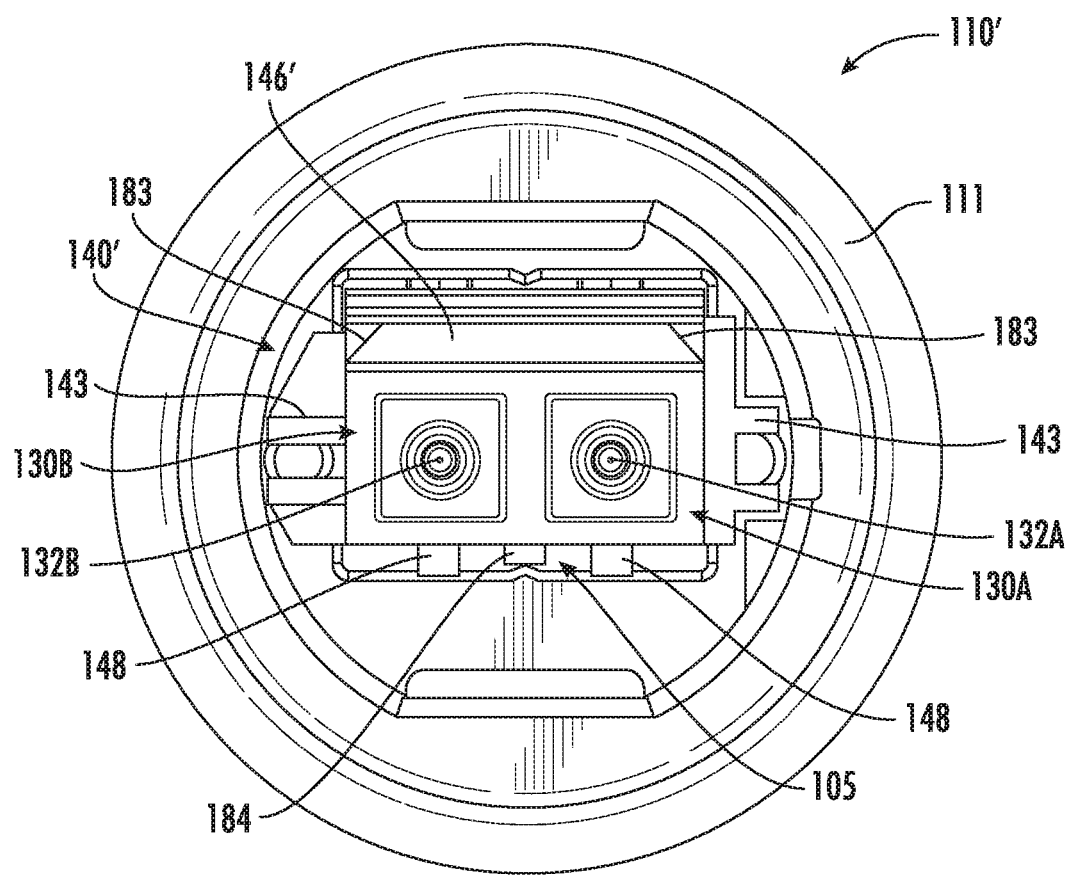
Figure 8A:
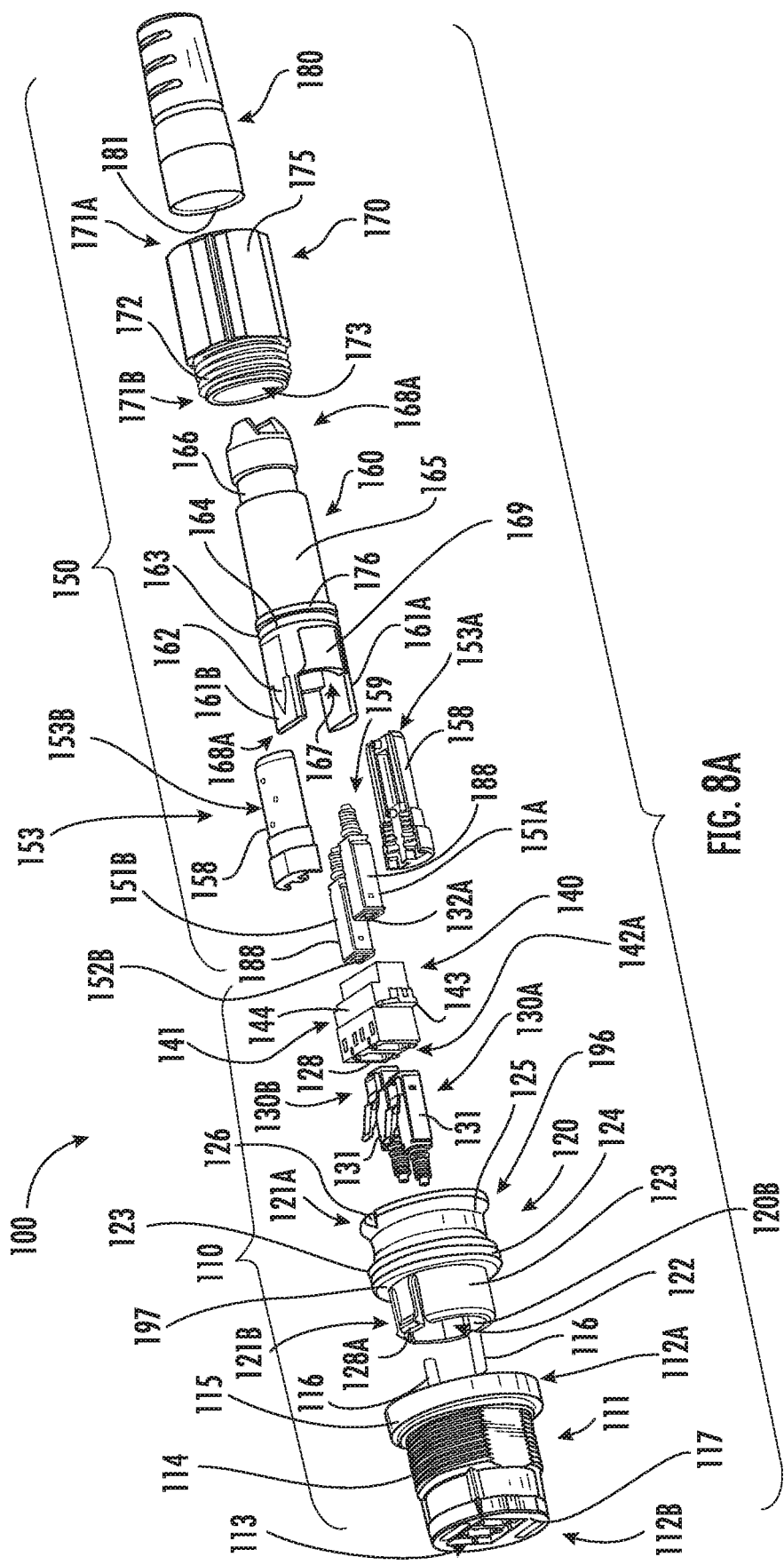
Figure 8B:
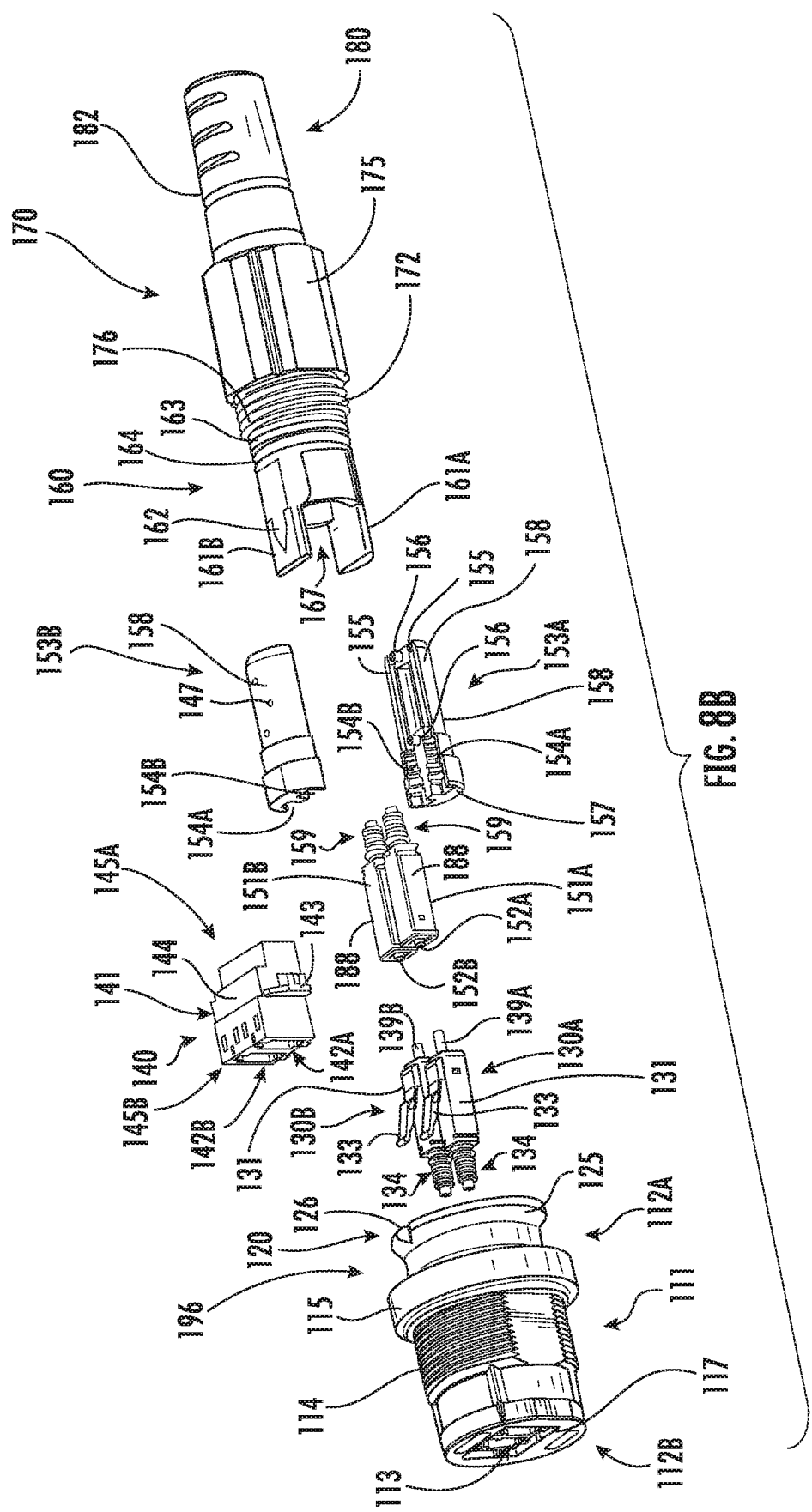
Figure 9:
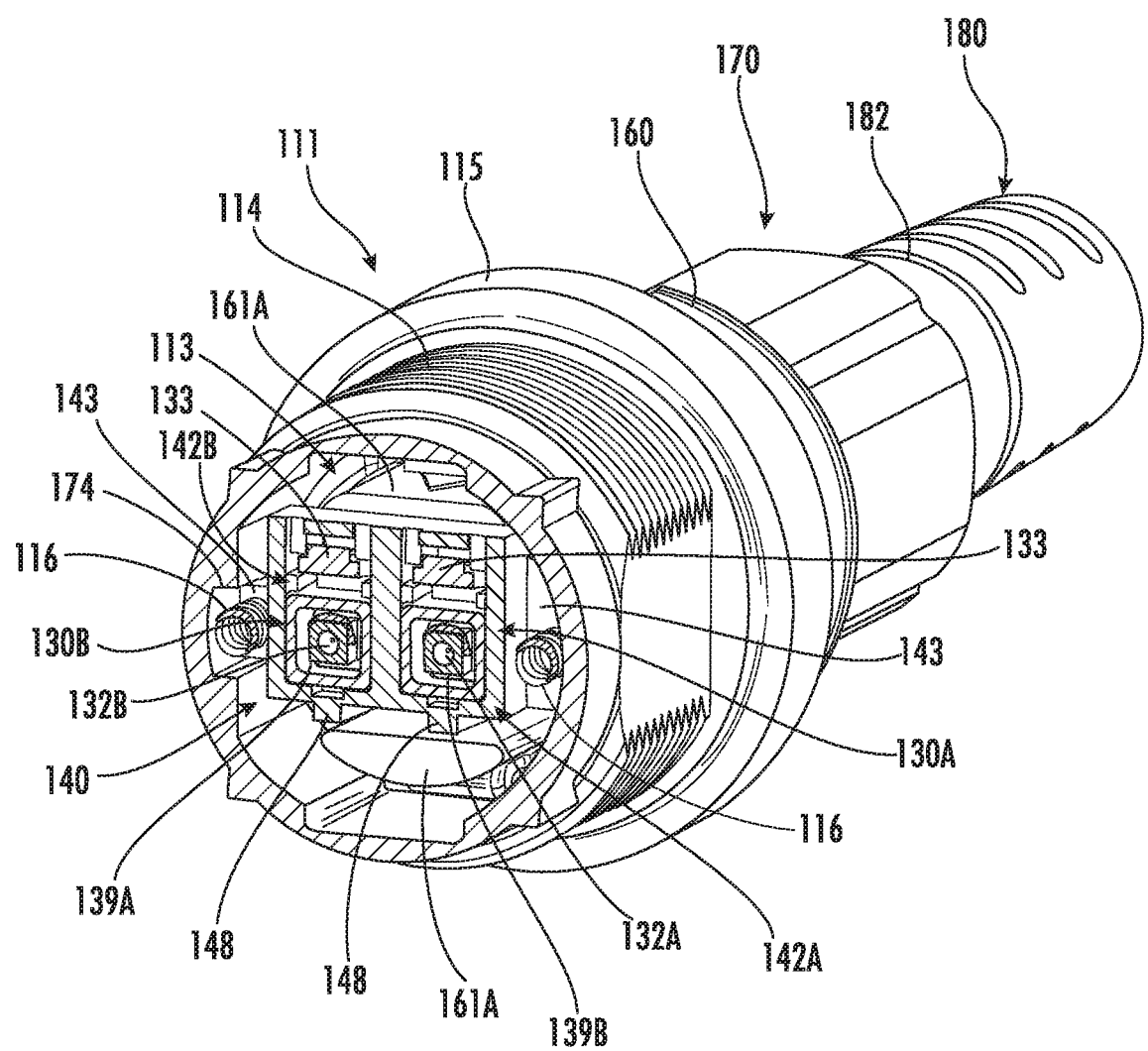
Figure 10:
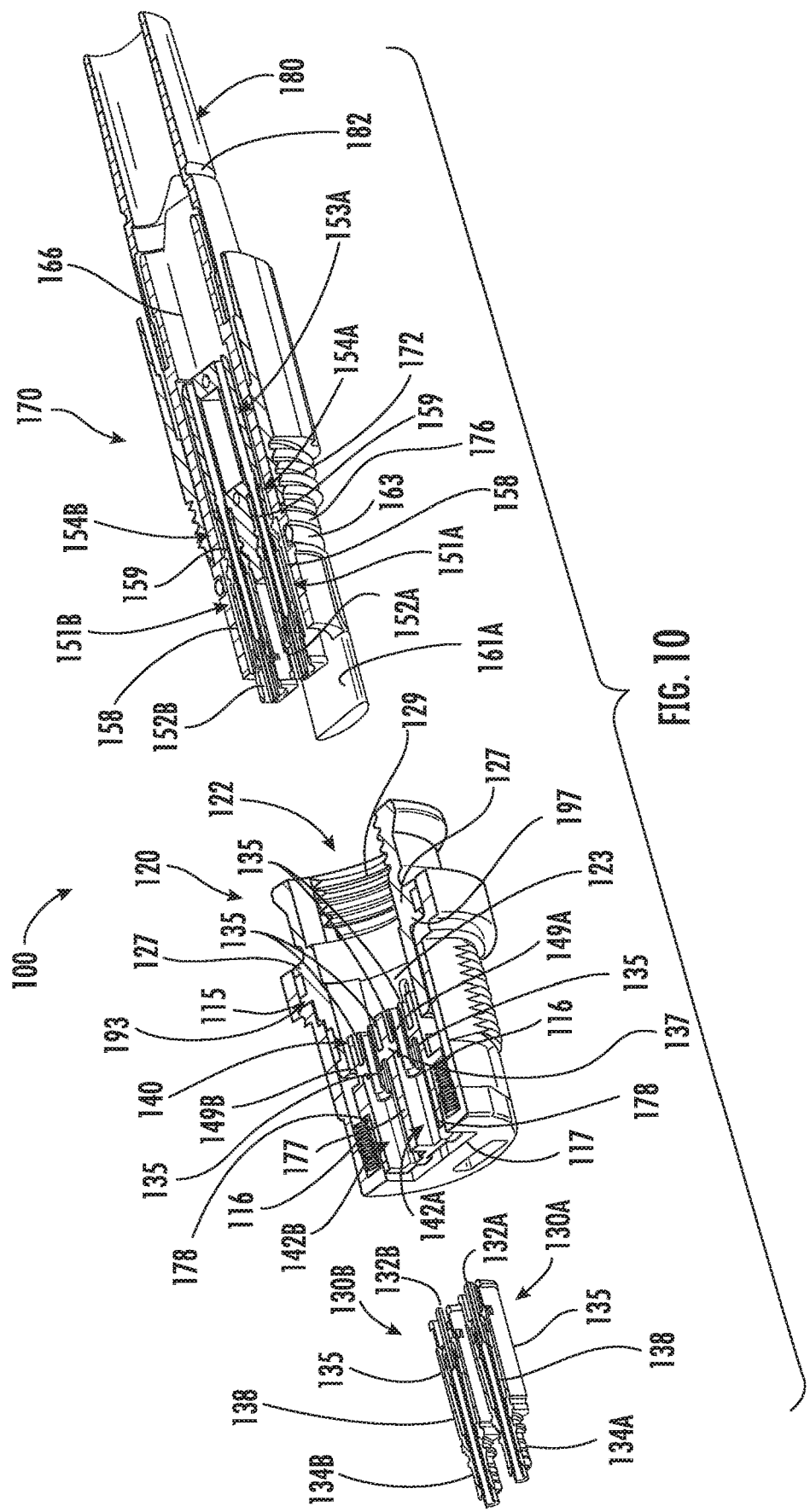
Figure 11:
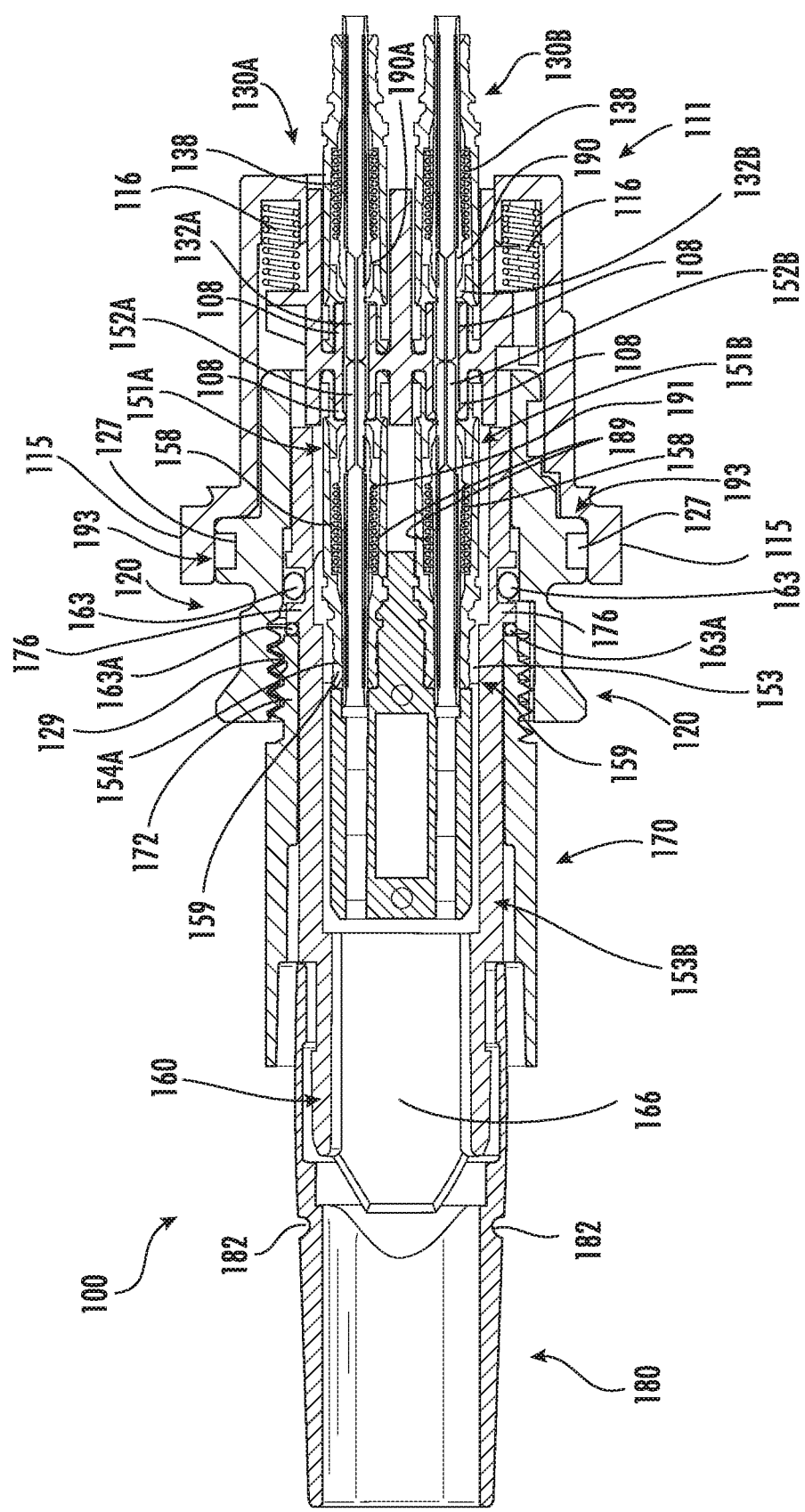
Figure 12:
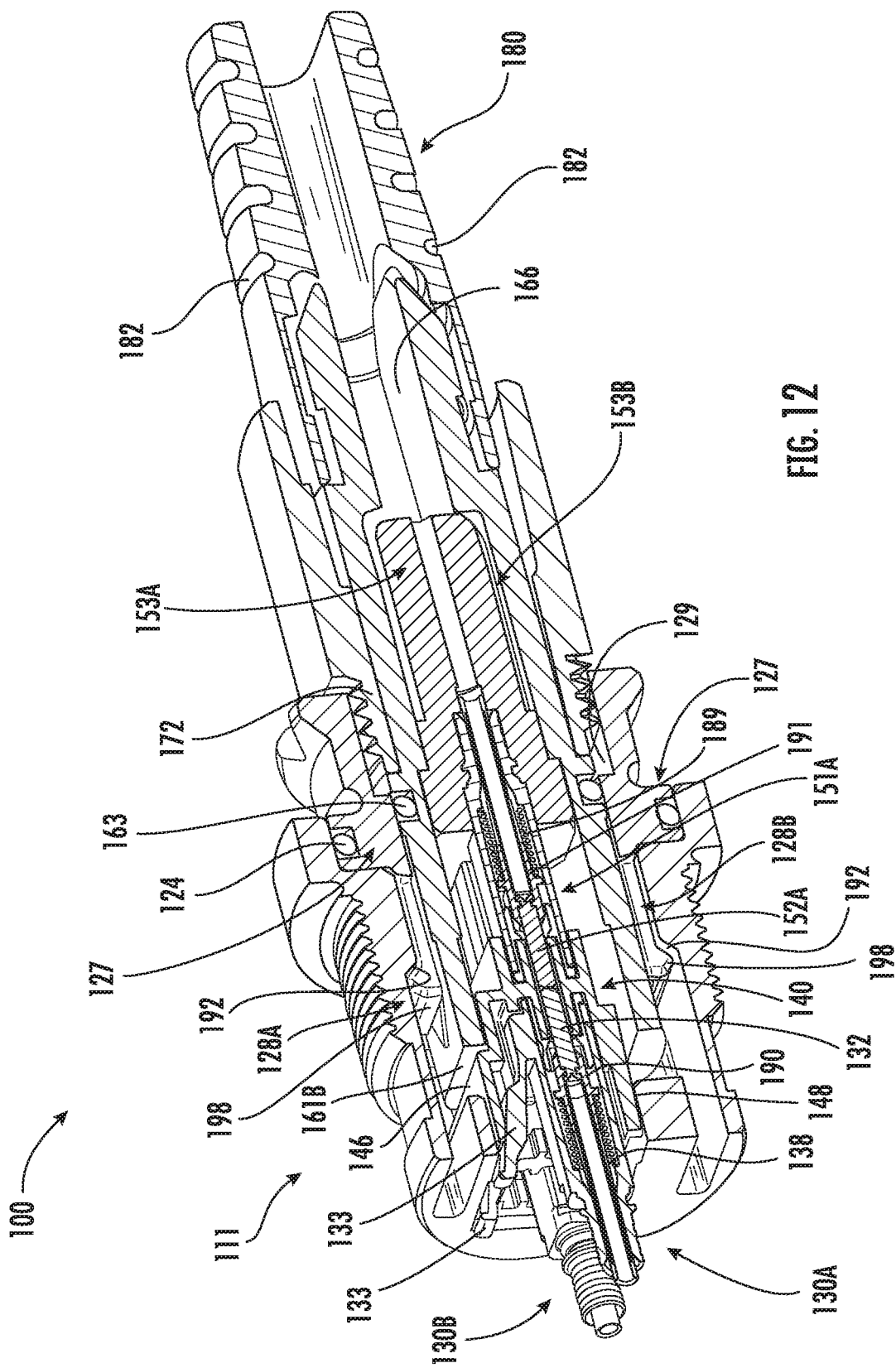
Figure 13:
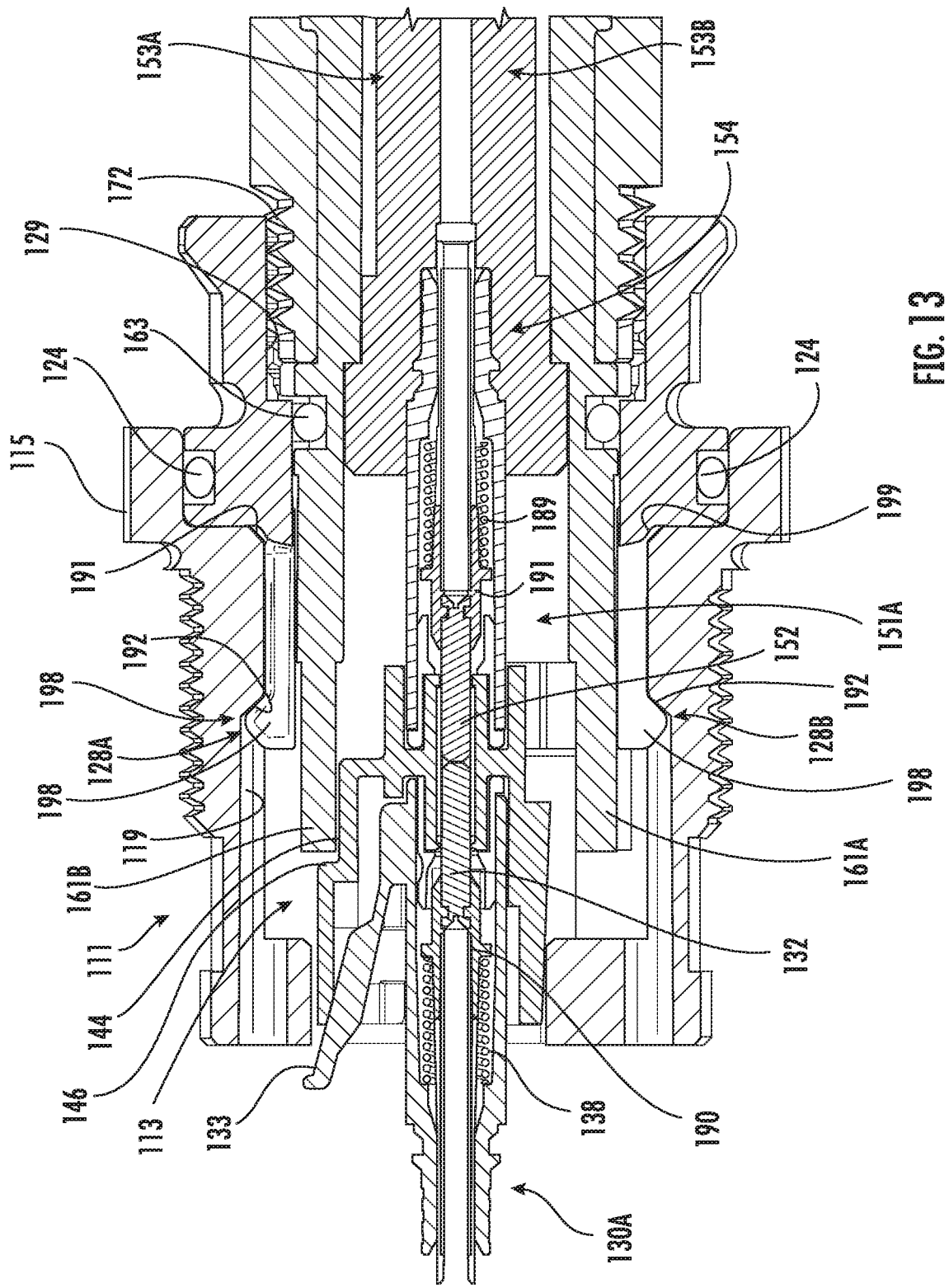
Figure 14A:
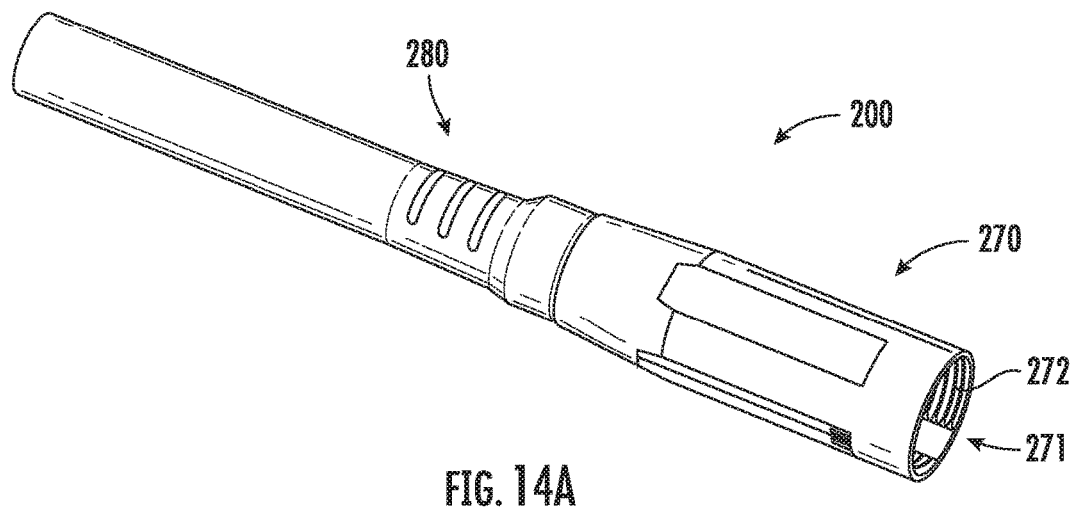
Figure 14B:
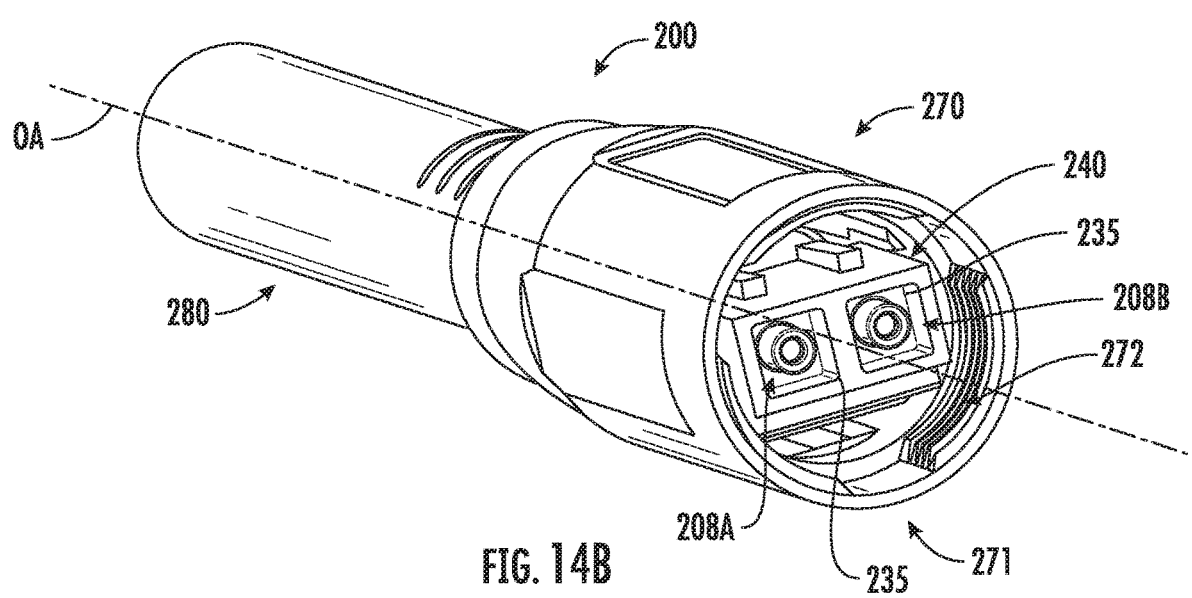
Figure 14C:
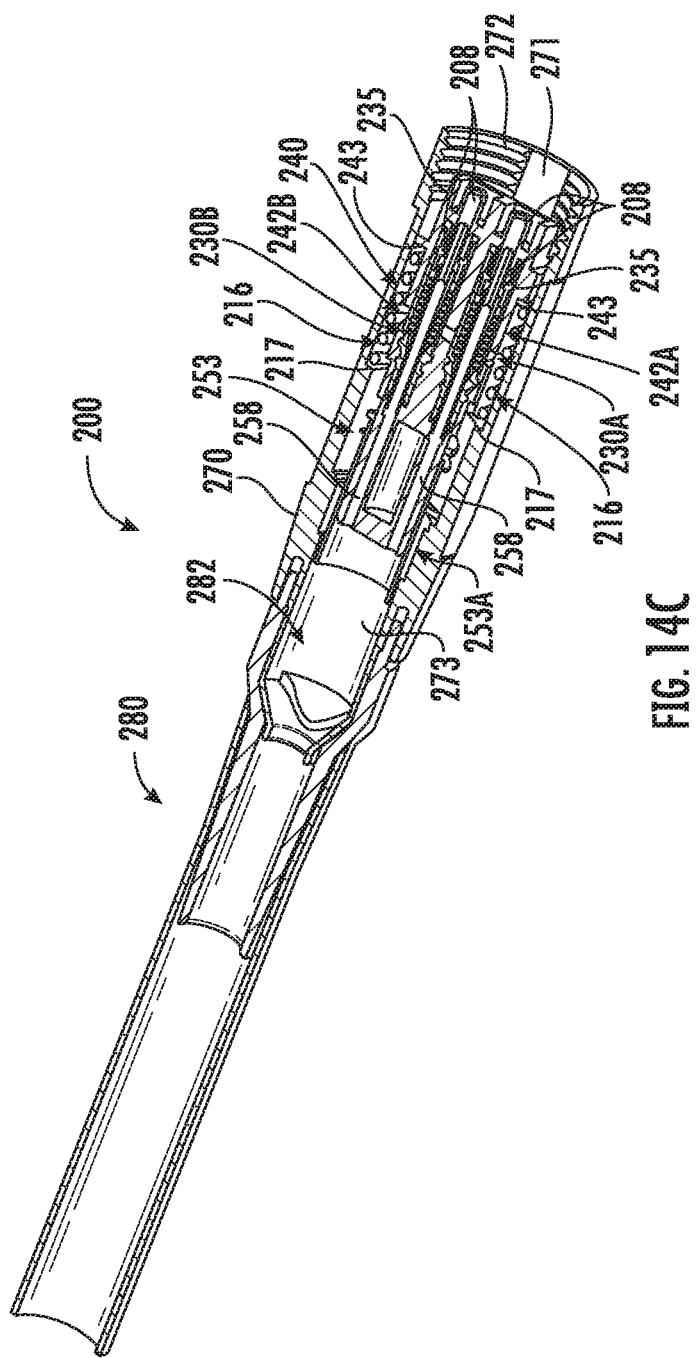

1 in an unmated state according to one or more embodiments described and illustrated herein;

FIG. 3 schematically depicts another partially exploded perspective view of the example optical connection system of FIG. 1 in an unmated state according to one or more embodiments described and illustrated herein;

FIG. 4A schematically depicts a rear view of an optical receptacle assembly without receptacle optical connectors disposed therein according to one or more embodiments described and illustrated herein;

FIG. 4B schematically depicts a rear view of the optical receptacle assembly of FIG. 4A with receptacle optical connectors disposed therein according to one or more embodiments described and illustrated herein;

FIG. 5A schematically depicts a front view of the optical receptacle assembly of FIG. 4A without receptacle optical connectors disposed therein according to one or more embodiments described and illustrated herein;

FIG. 5B schematically depicts a front view of the optical receptacle assembly of FIG. 4B with receptacle optical connectors disposed therein according to one or more embodiments described and illustrated herein;

FIG. 6A schematically depicts a front perspective view of an optical plug connector assembly according to one or more embodiments described and illustrated herein;

FIG. 6B schematically depicts a front elevation view of the optical plug connector assembly of FIG. 6A according to one or more embodiments described and illustrated herein;

FIG. 7A schematically depicts a front perspective view of another optical plug connector assembly according to one or more embodiments described and illustrated herein;

FIG. 7B schematically depicts a front elevation view of the optical plug connector assembly of FIG. 7A according to one or more embodiments described and illustrated herein;

FIG. 7C schematically depicts a front view of an optical receptacle assembly for mating with the optical plug connector assembly of FIGS. 7A and 7B according to one or more embodiments described and illustrated herein;

FIG. 8A schematically depicts an exploded perspective view of an example optical connection system according to one or more embodiments described and illustrated herein;

FIG. 8B schematically depicts another exploded perspective view of the example optical connection system of FIG. 8A according to one or more embodiments described and illustrated herein;

FIG. 9 schematically depicts a rear, partial cutaway view of an example optical connection system according to one or more embodiments described and illustrated herein;

FIG. 10 schematically depicts a cutaway perspective view of an example optical connection system according to one or more embodiments described and illustrated herein;

FIG. 11 schematically depicts a cross-sectional view of an example optical connection system according to one or more embodiments described and illustrated herein;

FIG. 12 schematically depicts another cutaway perspective view of an example optical connection system according to one or more embodiments described and illustrated herein;

FIG. 13 schematically depicts another cross-sectional view of an example optical connection system according to one or more embodiments described and illustrated herein;

FIG. 14A schematically depicts a perspective view of another example optical cable assembly having an adapter housing according to one or more embodiments described and illustrated herein;

FIG. 14B schematically depicts another perspective view of the example optical cable assembly depicted by FIG. 14A according to one or more embodiments described and illustrated herein; and FIG. 14C schematically depicts a cutaway perspective view of the example optical cable assembly depicted by FIGS. 14A and 14B according to one or more embodiments described and illustrated herein.

DETAILED DESCRIPTION

Embodiments are directed to optical cables and connectors in an optical waveguide network, and particularly in optical cables and connectors providing fiber-to-the-location-'x' (FTTx), where 'x' in the acronym represents the end location of the optical waveguide. For instance, FTTC is fiber to the curb. In this case, the network is a fiber to the premises (FTTP) application. FTTP architectures advantageously route at least one optical waveguide to the premises, thereby providing a high bandwidth connection to the subscriber. Applications to locations other than to the curb or premises are also possible. In such networks, a drop links provides the optical fiber to the location. In the embodiments of the present disclosure, a drop link comprises a preconnectorized fiber optic drop cable (hereinafter an optical cable assembly) suitable for outdoor environments. Preconnectorized cable assemblies described herein effectively and economically streamline the deployment and installation of optical waveguides into the last mile of the fiber optic network such as to the premises. Although, the network described above is directed to one type of FTTx architecture, other networks can employ the embodiments of the present disclosure. Other networks may include other suitable components such as distribution closures, amplifiers, couplers, transducers, or the like. Likewise, other networks besides FTTx architectures can also benefit from the concepts of the present disclosure.

Preconnectorized optical cable assemblies may be routed to a premise using different exemplary techniques. Preconnectorized optical cable assemblies may be routed to premises in an aerial application. Alternatively, preconnectorized optical cable assemblies may be routed to a premise in a buried application. In the aerial application, a first end of the preconnectorized cable assembly is attached at a first interface device located on pole, and a second end is attached at an interface device located at the subscriber premises. In buried applications, the first and second ends of a preconnectorized optical cable assembly are respectively connected to an interface device located inside an enclosure at ground-level and at an interface device at the premise (e.g., an exterior wall of the premise). The interface devices include at least one optical receptacle for making the optical connection with an end of preconnectorized optical cable assembly.

Conventional preconnectorized fiber optic drop cables have a single optical fiber that is routed to the premise. In embodiments of the present disclosure, two optical fibers are included in the preconnectorized optical cable assembly that is used as a drop link. Doubling the number of optical fibers in the drop link to a single premise includes several advantages. The main cost in installing a drop link is the cable installation. Thus, adding an additional optical fiber and internal optical connector does not add significant cost. Including an additional fiber in the optical cable assembly provides redundancy. If one optical fiber breaks or fails, the other optical fiber may be used. Two optical fibers allow for data capacity to increase. Additionally, two different communication protocols may be utilized, such as a first communication protocol on a first optical fiber and a second communication protocol on the second optical fiber. The use of two optical fibers also may allow for network sharing between service providers.

As further described below, the embodiments of the present disclosure include a biased adapter housing that maintains two optical connectors each further maintaining an optical fiber. Bias members allow the adapter housing to translate in the optical axis of the optical connector. The ability for the adapter housing to translate and to float overcomes strict mechanical tolerances required for optical coupling between mated optical connectors because the outer components do not contribute to the mating of the internal optical connectors. Further, the biased nature of the adapter housing minimizes the effect of thermal expansion and contraction across a wide range of operating temperatures. The ability of the adapter housing to translate also minimizes the effect of loading on the mated optical connectors. The freedom of movement of the adapter housing helps ensure that the ferrule tips and fiber end faces are not damaged due to high loads at the optical interface between mated optical connectors.

Figure 2:
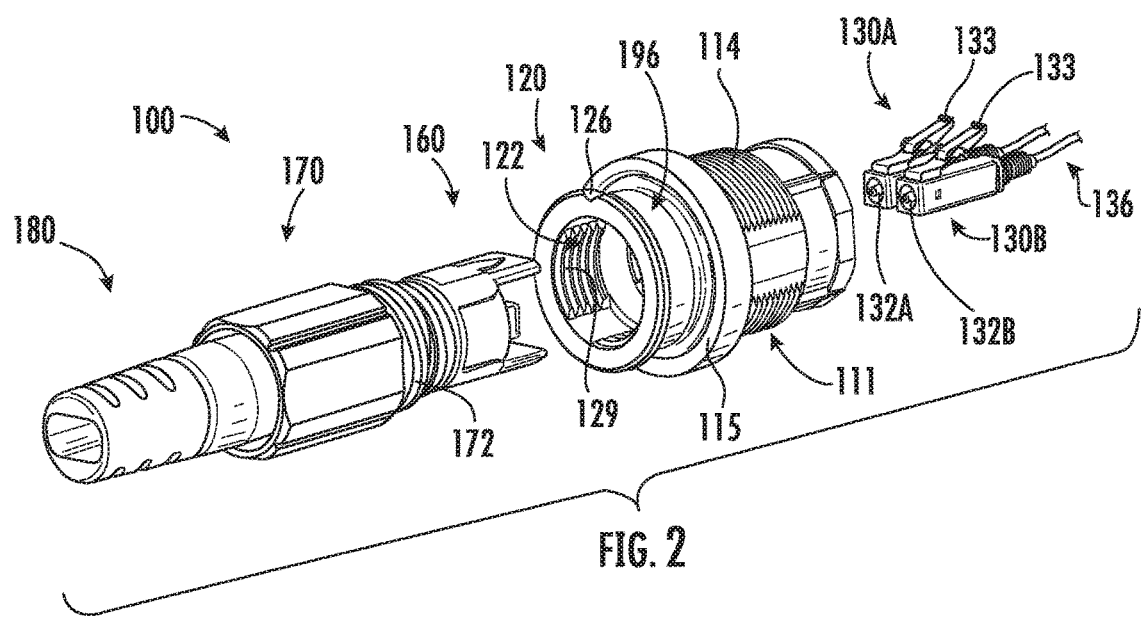
FIG. 2 schematically depicts a partially exploded perspective view of the example optical connection system of FIG.

Referring now to FIGS. 1-3, an optical connection system comprising an optical cable assembly 101 and an optical receptacle assembly 110 is schematically illustrated. FIG. 1 depicts the optical cable assembly 101 and the optical receptacle assembly 110 in a mated state. FIGS. 2 and 3 depict the optical cable assembly 101 and the optical receptacle assembly 110 in an unmated state and the optical receptacle assembly 110 in a partially exploded view.

The optical receptacle assembly 110 may be provided in an enclosure of an interface device, such as an aerial interface device or within an enclosure on the ground. As described in more detail below, the optical receptacle assembly 110 includes a receptacle housing 111 having an outer threaded surface 114 configured such that the optical receptacle assembly 110 may be threadedly mounted within a bulkhead of an interface device, thereby providing an optical port. Embodiments of the present disclosure provide a duplex optical connection. Thus, the optical receptacle assembly 110 comprises a duplex receptacle optical connector system comprising a first receptacle optical connector 130A and a second receptacle optical connector 130B. In the illustrated embodiment, the first receptacle optical connector 130A and the second receptacle optical connector 130B are configured as LC optical connectors that provide an LC duplex interface. It should be understood that other optical connector types may be utilized, such as FC, ST, MT and the like.

Generally, most of the components of the optical receptacle assembly 110 may be formed from a suitable polymer. As a non-limiting example, the polymer may be a UV stabilized polymer such as ULTEM 2210; however, other suitable materials are possible. For instance, stainless steel or any other suitable metal may be used for various components.

As described in more detail below, each of the first receptacle optical connector 130A and the second receptacle optical connector 130B maintain a receptacle optical fiber 136 for providing an optical communication interface at the optical receptacle assembly 110.

FIGS. 4A and 4B show a rear view of an example optical receptacle assembly 110 and FIGS. 5A and 5B show a front view of the example optical receptacle assembly 110. FIGS. 4A and 5A illustrate the optical receptacle assembly 110 without the first receptacle optical connector 130A and the second receptacle optical connector 130B. FIGS. 4B and 5B illustrate the optical receptacle assembly 110 with the first receptacle optical connector 130A and the second receptacle optical connector 130B included.

FIGS. 8A and 8B depict two exploded perspective views of the optical connection system 100 depicted by FIGS. 1-3. Referring collectively to FIGS. 1-3, 4A, 4B, 5A, 5B, 8A and 8C, the example optical receptacle will be described in greater detail. The receptacle housing 111 defines a receptacle passage 113 extending between a first end 112A and a second end 112B. A flange 115 is provided at the first end 112A of the receptacle housing 111.

In addition to the receptacle housing 111, the example optical receptacle assembly 110 further comprises an adapter sleeve 120 and an adapter housing 140 for maintaining the first receptacle optical connector 130A and the second receptacle optical connector 130B. The adapter sleeve 120 is disposed within the receptacle passage 113, and the adapter housing 140 is disposed within both the adapter sleeve 120 and the receptacle passage 113, as described in more detail below.

As shown in FIG. 8A, the adapter sleeve 120 comprises a main body 123 at a second end 121B and an exposed portion 196 and a flange portion 125 at a first end 121A. A sleeve passage 122 extends between the first end 121A and the second end 121B. As shown in FIG. 8B, the exposed portion 196 and the flange portion 125 extend out of the receptacle housing 111. A circumferential groove 127 separates the main body 123 and the exposed portion 196. The main body 123 may have a diameter that is smaller than the exposed portion 196 to aid in seating the adapter sleeve 120 within the receptacle passage. The circumferential groove 127 defines a shoulder 197 facing the second end 121B of the adapter sleeve 120, and provides a location that receives a sealing member 124 that provides a sealing interface between the adapter sleeve 120 and the receptacle housing 111.

An inner threaded surface 129 is present within the sleeve passage 122 at the exposed portion 196 for threadably engaging an outer threaded surface 172 of a coupling nut 170 of a mated optical plug connector assembly 150.

The main body 123 of the adapter sleeve 120 comprises at least one engagement tab for mating with the receptacle housing 111. Referring to FIG. 8A, the adapter sleeve 120 comprises a first engagement tab 128A and a second engagement tab 128B located on opposite sides of the main body 123. The first engagement tab 128A and the second engagement tab 128B are separate from the remaining material of the main body 123 by notches such that the first engagement tab 128A and the second engagement tab 128B may radially flex independent of the main body 123. Each of the first engagement tab 128A and the second engagement tab 128B has a detent 198 at its end. The detent 198 has an angled outer surface that is angle away from a centerline of the adapter sleeve 120 and toward the first end 121A.

FIG. 10 depicts a cutaway view of the example optical connection system 100. FIG. 11 depicts a cross-sectional view of the example optical connection system 100 in a mated state. Referring to both FIGS. 10 and 11, the main body 123 of the adapter sleeve 120 is disposed within the receptacle passage 113 of the receptacle housing 111. The flange 115 of the receptacle housing 111 defines an inner notch 193. When the adapter sleeve 120 is within the receptacle housing 111, the circumferential groove 127 of the adapter sleeve 120 is seated within the inner notch 193 of the flange 115 of the receptacle housing 111. The sealing member 124, which may be configured as an O-ring, provides a seal between the adapter sleeve 120 and the receptacle housing 111.

FIG. 12 depicts a cutaway view of the example optical connection system 100 shown with a cut direction that is orthogonal to the cut direction of FIG. 10. FIG. 13 depicts a cross-sectional view along the cutaway line of FIG. 12. Referring to both FIGS. 12 and 13, the inner surface of the receptacle housing 111 defining the receptacle passage 113 comprises at least one shoulder 197 operable to engage the at least one engagement tab of the adapter sleeve 120. The at least one shoulder 197 may extend entirely around the circumference of the inner surface of the receptacle housing 111 or only at the areas where the at least one engagement tab is located when the adapter sleeve 120 is present within the receptacle passage 113.

When the main body 123 is inserted into the receptacle passage 113 of the receptacle housing 111, the detent 198 of the first engagement tab 128A and the second engagement tab 128B contacts a surface of the receptacle housing 111, causing the first engagement tab 128A and the second engagement tab 128B to be inwardly flexed. The opening of the receptacle passage 113 may have a tapered surface 199, and the end surface of the detent 198 may also be angled to allow the detent 198 to slidably engage the tapered surface 119 and flex the first engagement tab 128A and the second engagement tab 128B. Once the detent 198 reaches the shoulder 192, the first engagement tab 128A and the second engagement tab 128B return to a neutral position such that the detent 198 engages the shoulder 192, thereby locking the adapter sleeve 120 within the receptacle passage 113. FIGS. 4A-5B show the first engagement tab 128A and the second engagement tab 128B through first and second openings 118A, 118B of a rear wall 117. The first engagement tab 128A and the second engagement tab 128B may be released from the shoulder 192 through the first and second openings 118A, 118B using a tool, for example.

Referring once again to FIGS. 8A and 8B, the adapter housing 140 comprises a housing body 141 having a first connector opening 142A for receiving the first receptacle optical connector 130A and a second connector opening 142B for receiving the second receptacle optical connector 130B. The first and second connector openings 142A, 142B are separated by a central wall 177 and extend from a first end 145A to a second end 145B of the housing body 141.

In the illustrated embodiment, the adapter housing 140 has a tab 143 that extends from each side. Each of the tabs 143 engage a bias member 116 disposed between the tabs 143 and a rear wall 117 of the receptacle housing 111.

FIG. 9 depicts a cutaway view with a rear portion of the receptacle housing 111 and the adapter housing 140 removed. The inner surface of the receptacle housing 111 has side notches 174 (only one is visible in FIG. 9) for receiving the tabs 143 of the adapter housing 140 and the bias members 116. The arrangement of the tabs 143 within the side notches 174 allow longitudinal movement of the adapter housing 140 by way of the bias members 116 but prevents rotation of the adapter housing 140 with respect to the receptacle housing 111. The adapter housing 140 may include one or ribs 148 extending from a surface 105. In some embodiments, the one or more ribs 148 may be contact an inner surface of the receptacle housing 111 and, without limitation, may be disposed within one or more interior grooves (not shown) of the receptacle housing 111 (see FIG. 12).

The adapter housing further includes a ledge portion 144 that extends from a shoulder portion 146.

Referring to the cutaway view of FIG. 10, which illustrates a bottom half of the adapter housing 140, the adapter housing comprises a first ferrule cavity 149A and a second ferrule cavity 149B that extend in both longitudinal directions from a medial wall 137. Gaps are provided between the first ferrule cavity 149A, the second ferrule cavity, external walls 178 of the adapter housing 140, and the central wall 177. End portions of the first and second receptacle optical connectors 130A, 130B and the first and second plug optical connectors 151A, 151B are disposed within the gaps 135, as described in more detail below.

A first ferrule sleeve 139A and a second ferrule sleeve 139B (FIG. 8B) are disposed within the first ferrule cavity 149A and the second ferrule cavity 149B, respectively. As described in more detail below, the first and second ferrule sleeves 139A, 139B receive the ferrules of the optical receptacle assembly 110 and the optical cable assembly 101.

Referring again to FIGS. 8A and 8B, the first and second receptacle optical connectors 130A, 130B each comprise a receptacle body 131, and a flexible locking tab 133 extending from a top surface of the receptacle body 131. The first and second receptacle optical connectors 130A, 130B also include a rear body 134 shaped to surround an outer coating of the receptacle optical fibers 136 and to provide strain relief thereto. The example first and second receptacle optical connectors 130A, 130B are configured as LC type optical connectors.

Referring to FIGS. 10-13, the first receptacle optical connector 130A further includes a first receptacle ferrule 132A and the second receptacle optical connector 130B further includes a second receptacle ferrule 132B. The first receptacle ferrule 132A and the second receptacle ferrule 132B are each maintained by a ferrule holder 190 that is biased within the receptacle body 131 by a bias member 138. Thus, the first receptacle ferrule 132A and the second receptacle ferrule 132B are able to laterally move in a direction along the optical axis of the optical receptacle assembly 110, and translate during mating with the optical cable assembly 101.

Referring FIG. 9, the locking tabs 133 of the first and second receptacle optical connectors 130A, 130B engage features 179 of the adapter housing 140 to removably latch the first and second receptacle optical connectors 130A, 130B to the adapter housing 140.

An optical plug connector assembly 150 configured to mate with the example optical receptacle assembly 110 is now described. Referring to FIGS. 1-3, the optical plug connector assembly 150 generally comprises a shroud 160, a first plug optical connector 151A, a second plug optical connector 151B, a coupling nut 170, and a boot 180. The optical cable assemblies described herein may be hardened optical cables having environmental performance that meets or exceeds GR-3120. FIGS. 6A-7B illustrate assembled optical plug connector assemblies 150 and 150' without the optical receptacle assembly 110. Particularly, FIGS. 6A and 6B illustrate a perspective view and a front elevation view of the optical plug connector assembly 150 shown in FIGS. 1-3, respectively. FIGS. 7A and 7B illustrate a perspective view and a front elevation view of an alternative optical plug connector assembly 150 having keying features as described in detail below.

Generally, most of the components of the optical plug connector assembly 150 may be formed from a suitable polymer. As a non-limiting example, the polymer may be a UV stabilized polymer such as ULTEM 2210; however, other suitable materials are possible. For instance, stainless steel or any other suitable metal may be used for various components.

As described in more detail below, the coupling nut 170 is rotatably coupled to the adapter sleeve 120 and has an outer threaded surface 172 that is configured to threadably engage the inner threaded surface 129 of the adapter sleeve 120 when the optical plug connector assembly 150 is mated to the optical receptacle assembly 110.

Referring generally to FIGS. 1-3, 6A, 6B, 8A and 8B, the first and second plug optical connectors 151A, 151B are similar to the first and second receptacle optical connectors 130A, 130B in that they have a plug connector body 188, a rear body 159, a ferrule holder 191 (see FIG. 11), and first and second plug ferrules 152A, 152B, respectively. In the illustrated embodiment, the first and second plug optical connectors 151A, 151B do not have locking tabs. The first and second plug optical connectors 151A, 151B are configured as an LC duplex assembly.

As best shown in FIGS. 8A and 8B, the optical plug connector assembly further includes a connector housing 153. The connector housing 153 comprises a first half-shell 153A and a second half-shell 153B. In some embodiments, the connector housing is a part of a crimp housing assembly further including a crimp band (not shown) that holds the first half-shell 153A and the second half-shell together 153B. However, in other embodiments, no crimp band is provided. Although, the term half-shell is used, it is to be understood that it means suitable shells and includes shells that are greater than or less than half of the crimp housing. The first half-shell 153A may be identical to the second half-shell 153B, or the two half-shells may be different from one another.

FIGS. 8A and 8B show the inner surface of the first half-shell 153A. The second half-shell 153B has similar features as the first half-shell 153A. The half-shell includes a first end for securing the first and second plug optical connectors 151A, 151B a second end that provides strain relief. A longitudinal axis is formed between first end and second end through which half of a longitudinal passage is formed. When assembled, optical fibers pass through the longitudinal passage and are held in a bore of the first and second plug ferrules 152A, 152B.

The first half-shell 153A (and the second half-shell 153B) comprises a first body cavity 154A configured to receive the first plug optical connector 151A and a second body cavity 154B configured to receive the second plug optical connector 151B. A portion of the plug connector body 188 is disposed in the first body cavity 154A and the second body cavity 154B, while the rear body 159 is disposed in the first body cavity 154A and the second body cavity 154B. The optical fibers are disposed in fiber cavities 155. The first half-shell 153A has two engagement members configured as posts that are inserted into two corresponding engagement members configured as bores within the second half-shell 153B. The mating of the engagement members provides alignment and coupling between the first half-shell 153A and the second half-shell 153B. Each individual half-shell may include a post and a bore, or other engagement features. The first and second half-shells 153A, 153B may also include holes 147 for inserting adhesive to secure the optical cables and first and second plug optical connectors 151A, 151B within the connector housing 153.

When fully assembled, the connector housing 153 fits into the shroud 160. Additionally, the connector housing 153 is keyed to direct the insertion of the connector housing 153 into the shroud 160. In this case, the first and second half-shells 153A, 153B include planar surfaces 157 on opposite sides of connector housing to inhibit relative rotation between the connector housing 153 and the shroud 160. In other embodiments, the connector housing 153 may be keyed to the shroud 160 using other configurations such as a complementary protrusion/groove or the like.

Referring once again to FIGS. 8A and 8B, the shroud 160 has a generally cylindrical shape with a first end 168A and a second end 168B. The shroud 160 generally protects the first and second plug optical connector assemblies 151A, 151B and may also key the optical plug connector assembly 150 with the respective mating optical receptacle assembly 110. The shroud 160 includes a shroud passage 167 between first and second ends 168A and 168B. As provided above, the shroud passage 167 is keyed so that the connector housing 153 is inhibited from rotating within the shroud 160.

The illustrated shroud 160 includes a first notch 169A and a second notch 169B on opposite sides of first end 168A and extending from a medial portion of the shroud 160, thereby defining a first alignment finger 161A and a second alignment finger 161B. In addition to aligning the shroud 160 with the optical receptacle assembly 110 during mating, the first and second alignment fingers 161A, 161B may extend slightly beyond the first and second plug optical connectors 151A, 151B as shown in FIG. 6A, thereby protecting the same.

As shown in FIGS. 6A and 6B, the first and second alignment fingers 161A, 161B have different shapes so that the optical plug connector assembly 150 and optical receptacle assembly 110 only mate in one orientation. In the illustrated embodiment, this orientation is marked on the first alignment finger 161A by an alignment indicia 162 so that the craftsman can quickly and easily mate the optical cable assembly 101 with the optical receptacle assembly 110. In this case, the alignment indicia 162 is an arrow molded into the first alignment finger 161A; however, other suitable indicia may be used. The arrow is aligned with complimentary alignment indicia 126 disposed on the adapter sleeve 120, thereby allowing the craftsman to align indicia 162, 126 so that the first and second alignment fingers 161A, 161B can be seated into the optical receptacle assembly 110.

FIGS. 7A and 7B show an alternative optical plug connector assembly 150' having keying features to prevent the duplex preconnectorized optical plug connector assembly 150' from being inserted into an optical receptacle having only one receptacle optical connector. Particularly, the first and second alignment fingers 161A' and 161B' have keying features to ensure that the optical plug connector assembly 150' is inserted into the correct optical receptacle (e.g., into a duplex connector rather than a single fiber optical connector). In the example of FIGS. 7A and 7B, the second alignment finger 161B' has a keying protrusion 194 at each edge (i.e., a first keying protrusion at a first edge and a second keying protrusion at a second edge) and the first alignment finger 161A' has a keying groove 195 within an inner surface. As shown in the example embodiment, the second alignment finger 161B' (or the first alignment finger 161A') may have chamfered surfaces 107 that correspond to one or more surfaces of the optical receptacle assembly 110.

The keying features of the optical cable assembly 101, such as those shown in FIGS. 7A and 7B, may correspond to keying features of the optical receptacle assembly 110 such that the optical cable assembly 101 can only be mated with the proper optical receptacle assembly 110. Referring to FIG. 7C, an example optical receptacle 110' without an adapter sleeve is illustrated. The example optical receptacle 110' has an adapter housing 140' that includes keying features corresponding to those shown in FIGS. 7A and 7B. Particularly, the shoulder portion 146' of the adapter housing 140' has two chamfered portions 183 that provide clearance for the keying protrusions 194 of the second alignment finger 161B'. The shoulder of an adapter housing that does not include the chamfered surface will interfere with the keying protrusions 194 of the optical cable assembly 101, thereby preventing mating and damaging the ferrules and/or optical fibers. Additionally, the example adapter housing 140' has a keying post 184 extending for a bottom surface 105 of the adapter housing 140'. The keying post 184 is disposed within the keying groove 195 of the first alignment finger 161A' during mating between the optical receptacle assembly 110 and the optical cable assembly 101. An adapter housing having a keying post in an incorrect location with respect to the keying groove will not be able mate with the plug optical connectors of an optical cable assembly.

Referring once again to FIGS. 8A and 8B, a medial portion of the shroud 160 has a groove 164 for seating a sealing member 163, such as an O-ring, that provides a weatherproof seal between the optical plug connector assembly 150 and the optical receptacle assembly 110 (or, in some embodiments, a protective cap (not shown)). The medial portion also includes a shoulder 176 that provides a stop for the coupling nut 170. The coupling nut 170 has a coupling nut passage 173 sized so that it fits over a coupling surface 165 and easily rotates about the coupling surface 165 of the shroud 160. In other words, the coupling nut 170 cannot move beyond the shoulder 176, but it is able to rotate with respect to the shroud 160. A sealing member 163A may be adjacent the shoulder 176 for providing sealing between the shroud 160 and the coupling nut 170.

The second end 168B of the shroud 160 may also include a stepped down portion having a relatively wide groove 166. This stepped down portion and groove 166 may be used for securing a heat shrink tubing (not shown) for weatherproofing the optical cable assembly 101. Specifically, the stepped down portion and groove 166 allow for the attachment of heat shrink tubing to the second end 168B of the shroud 160. The other end of the heat shrink tubing may be attached to a cable jacket 187, thereby inhibiting water from entering optical plug connector assembly 150.

The boot 180 is slid over a portion of the shroud 160 (and heat shrink tubing, if utilized). The boot 180 may be formed from a flexible material such as KRAYTON. The boot 180 (and heat shrink tubing, if utilized) generally inhibit kinking and provide bending strain relief to the cable near optical plug connector assembly 150.

As shown in FIG. 8A, the boot 180 has a longitudinal boot passage 181 with a stepped profile therethrough. The first end of the boot passage 181 is sized to fit over the second end of the shroud 160 (and heat shrink tubing if utilized). The first end of the boot passage 181 has a stepped down portion sized for the optical cable 185 and acts as stop for indicating that the boot 180 is fully seated. After the boot 180 is seated, the coupling nut 170 is slid up to the shoulder 176. A wire assembly or ring (not shown) can be secured to the boot 180 at an end closest to the coupling nut 170 (e.g., within groove 182). Thus, the coupling nut 170 is captured between the shoulder 176 of the shroud 160 and wire assembly (or other feature) on the boot 180, but other rear stops for the coupling nut 170 are possible.

Referring now to FIGS. 11-13, several views cutaway and cross-sectional views of the optical plug connector assembly 150 mated to an optical receptacle assembly 110 are shown. When the optical plug connector assembly 150 is inserted into the sleeve passage 122 and the receptacle passage 113, the first and second alignment nut fingers 161A, 161B extend beyond the adapter sleeve 120. The outer threaded surface 172 of the coupling nut is threadably engaged with the inner threaded surface 129 of the adapter sleeve 120. The second alignment finger 161B is adjacent to the ledge portion 144 of the adapter housing 140. The end of the second alignment fingers 161B act as a stop for the shoulder portion 146 of the adapter housing 140, thereby positioning the adapter housing 140 at the proper location during mating. The adapter housing 140 has some freedom of longitudinal movement.

The first and second receptacle ferrules 132A, 132B are disposed within the first and second ferrule sleeves 139A, 139B, respectively. The first and second plug ferrules 152A, 152B are also inserted into the first and second ferrule sleeves 139A, 139B, respectively. The end faces of the first and second plug ferrules 152A, 152B contact the end faces of the first and second receptacle ferrules 132A, 132B, respectively. The first and second receptacle ferrules 132A, 132B and the first and second plug ferrules 152A, 152B have some freedom of movement in the longitudinal direction and are biased by the receptacle bias members 138 and the plug bias members 189, respectively. The optical fibers in the first and second receptacle ferrules 132A, 132B are optically coupled to the optical fibers in the first and second plug ferrules 152A, 152B such that optical signals may pass therebetween.

The material of the adapter housing 140 defining the first and second ferrule cavities 149A, 149B is disposed within the first and second receptacle optical connectors 130A, 130B and first and second plug optical connectors 151A, 151B such that the end portions of the first and second receptacle optical connectors 130A, 130B and first and second plug optical connectors 151A, 151B are disposed within the gaps 135 of the adapter housing 140 (see FIG. 10). As shown in FIGS. 5A and 5B, the gaps 135 provide central protruding portions 108 that are inserted into the first and second optical plug connectors 151A, 151B and the first and second receptacle optical plug connectors 130A, 130B (see FIG. 11). Thus, the adapter housing 140 has a pair of opposing central protruding portions 108 each for receiving an optical connector.

The optical plug connector assembly 150 may be decoupled from the optical receptacle assembly 110 by unscrewing the coupling nut 170 from the sleeve adapter 120 and pulling the optical plug connector assembly 150 away from the optical receptacle assembly 110. Thus, the optical plug connector assembly 150 and the optical receptacle assembly 110 are easily coupled and decoupled.

The duplex connector concepts described herein may also be implemented in connection configurations other than the receptacle optical connector assemblies described above. For example, the adapter housings described above may be employed in inline adapter assemblies, such as an inline adapter for the ROC™ OptiTap® Drop Cable connector sold by Corning, Inc. of Corning, N.Y. Referring now to FIG. 14A, an example optical cable assembly 200 is illustrated. The optical cable assembly 200 has a female hardened connector that allows for inline optical connection between two optical cable assemblies.

The example optical cable assembly 200 generally comprises a boot 280 coupled to a connector housing 270. The connector housing 270 defines a passage having an opening 271 for receiving a corresponding male optical connector, and includes an inner threaded surface 272 operable to threadedly engage an exterior threaded surface of a male optical connector.

FIG. 14B shows another perspective view of the optical cable assembly 200 shown in FIG. 14A. An adapter housing 240 similar to the adapter housings described above is disposed within the connector housing 270 such that it may float, as well as translate in the direction of the optical axis OA of the optical cable assembly 200. As described above, the adapter housing 240 has gaps 135 or a recessed area for providing central protruding portions 208 that mate with optical connectors.

FIG. 14C is a cutaway view of the optical cable assembly 200 shown in FIGS. 14A and 14B. The connector housing 270 may have a boot end 282 that is inserted into an opening of the boot 280 such that the connector housing 270 is secured to the connector boot 280. It should be understood that an optical cable (not shown) having two optical fibers is positioned within the boot 280, and that the two optical fibers are disposed within the connector housing 270.

The optical cable assembly 200 further includes an internal connector housing 253 defined by two half-shells 253A, 253B as described above. FIG. 14C only illustrates half-shell 253A. It should be understood that the other half-shell 253B (not shown) mates to half-shell 253A as described above. First and second cable optical connectors 230A, 230B are disposed within the half-shells of the internal connector housing 153 in a manner similar to as described above. The first and second cable optical connectors 230A, 230B are disposed within first and second connector openings 242A, 242B of the adapter housing 240, respectively. The ends of the first and second cable optical connectors 230A, 230B are positioned within respective gaps 235 of the adapter housing 240 such that the central protruding portions 208 of the adapter housing 240 are inserted into the first and second optical connectors 230A, 230B. Central protruding portions 208 facing the opening are exposed and ready to receive optical connectors of a mated optical cable assembly.

As described above, the adapter housing 240 may include tabs 243 that provide an engaging surface for bias members 216. The connector housing 270 also includes a rear notch surface that provides another engaging surface for the bias members 216. Thus, the bias members 216 are disposed between the rear notch surface 217 and the tabs 243 of the adapter housing 240. The bias members 216 bias the adapter housing 240 forward toward the opening 271 and enable the adapter housing 240 to translate back away from the opening 271 during connector mating.

It should now be understood that embodiments of the present disclosure are directed to optical receptacle assemblies, optical plug connector assemblies, optical cable assemblies and optical connection system having a duplex optical connector arrangement for routing two optical fibers to a single premise.

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. An optical receptacle assembly comprising:
a receptacle housing, wherein the receptacle housing defines a receptacle passage and comprises a flange portion and an inner notch within the flange portion;
an adapter sleeve disposed within the receptacle passage of the receptacle housing, the adapter sleeve comprising a sleeve passage and a sleeve inner threaded surface along with a circumferential groove and a sealing member within the circumferential groove, wherein the circumferential groove sleeve is disposed within the inner notch of the flange portion of the receptacle housing;
an adapter housing disposed within the receptacle passage, the adapter housing comprising a first connector opening and a second connector opening; and
a first receptacle optical connector and a second receptacle optical connector, wherein the first receptacle optical connector is disposed within the first connector opening of the adapter housing and the second receptacle optical connector is disposed within the second connector opening of the adapter housing.

2. The optical receptacle assembly of claim 1, wherein each of the first receptacle optical connector and the second receptacle optical connector comprises a receptacle connector body that defines a passage and a ferrule within the passage.

3. The optical receptacle assembly of claim 1, wherein the adapter housing is at least partially disposed within the sleeve passage of the adapter sleeve.

4. The optical receptacle assembly of claim 3, wherein:
an inner surface of the receptacle housing that defines the receptacle passage comprises at least one shoulder;
the adapter sleeve comprises at least one engagement tab; and
the at least one engagement tab contacts the at least one shoulder to maintain the adapter sleeve within the receptacle passage of the receptacle housing.

5. The optical receptacle assembly of claim 1, wherein the optical receptacle assembly comprises at least one bias member disposed between at least one tab of the adapter housing and a wall of the receptacle housing such that the at least one bias member biases the adapter housing within the receptacle housing.

6. The optical receptacle assembly of claim 1, wherein the first receptacle optical connector is removably disposed within the first connector opening by a first locking tab and the second receptacle optical connector is removably disposed within the second connector opening by a second locking tab.

7. An optical connection system comprising:
an optical receptacle assembly comprising:
a receptacle housing, wherein the receptacle housing defines a receptacle passage;
an adapter sleeve disposed within the receptacle passage of the receptacle housing, the adapter sleeve comprising a sleeve passage and a sleeve inner threaded surface;
an adapter housing disposed within the receptacle passage, the adapter housing comprising a first connector opening and a second connector opening; and
a first receptacle optical connector and a second receptacle optical connector, wherein the first receptacle optical connector is disposed within the first connector opening of the adapter housing and the second receptacle optical connector is disposed within the second connector opening of the adapter housing;
an optical plug connector assembly comprising:
a shroud defining a shroud passage and comprising an outer coupling surface;
a coupling nut comprising a threaded outer surface and a coupling nut passage, wherein:
the outer coupling surface of the shroud is disposed within the coupling nut passage such that the coupling nut is configured to rotate about the outer coupling surface of the shroud; and the threaded outer surface of the coupling nut is configured to threadably engage the sleeve inner threaded surface of the adapter sleeve;

a connector housing comprising a first plug connector opening and a second plug connector opening, wherein the connector housing is disposed within the shroud passage; and a first plug optical connector and a second plug optical connector, wherein the first plug optical connector is disposed within the first plug connector opening and the second plug optical connector is disposed within the second plug connector opening.

8. The optical connection system of claim 7, wherein:
each of the first receptacle optical connector and the second receptacle optical connector comprises a receptacle connector body that defines a passage and a ferrule within the passage; and
each of the first plug optical connector and the second plug optical connector comprises a plug connector body that defines a passage and a ferrule within the passage.

9. The optical connection system of claim 8, wherein:
the adapter housing comprises a first ferrule cavity and a second ferrule cavity;
the optical receptacle assembly further comprises a first ferrule sleeve disposed in the first ferrule cavity and a second ferrule sleeve disposed in the second ferrule cavity;
each of the ferrules of the first receptacle optical connector, the second receptacle optical connector, the first plug optical connector and the second plug optical connector maintain an optical fiber; and
when the optical plug connector assembly is mated to the optical receptacle assembly, the optical fiber of the first plug optical connector is optically coupled to the optical fiber of the first receptacle optical connector within the first ferrule sleeve and the optical fiber of the second plug optical connector is optically coupled to the optical fiber of the second receptacle optical connector within the second ferrule sleeve.

10. The optical connection system of claim 7, wherein:
the connector housing comprises a first half-shell coupled to a second half-shell; and
each of the first half-shell and the second half-shell comprises a first body cavity and a second body cavity that, when the first half-shell is coupled to the second half-shell, define the first plug connector opening and the second plug connector opening, respectfully.

11. The optical connection system of claim 7, wherein:
the shroud further comprises a first alignment finger and a second alignment finger; and
a first notch and a second notch are defined between the first alignment finger and the second alignment finger.

12. The optical connection system of claim 11, wherein at least one of the first alignment finger and the second alignment finger comprises a keying feature.

13. The optical connection system of claim 11, wherein the first alignment finger comprises a keying groove within an inner surface and the second alignment finger comprises a first keying protrusion at a first edge of the second alignment finger and a second keying protrusion at a second edge of the second alignment finger.

14. The optical connection system of claim 7, wherein the shroud comprises a groove and a sealing member disposed within the groove.

15. The optical connection system of claim 7, wherein the adapter housing is at least partially disposed within the sleeve passage of the adapter sleeve.

16. The optical connection system of claim 15, wherein:
an inner surface of the receptacle housing that defines the receptacle passage comprises at least one shoulder;
the adapter sleeve comprises at least one engagement tab; and
the at least one engagement tab contacts the at least one shoulder to maintain the adapter sleeve within the receptacle passage of the receptacle housing.

17. The optical connection system of claim 16, wherein:
the shroud further comprises a first alignment finger and a second alignment finger; and
when the optical plug connector assembly is mated to the optical receptacle assembly, the shroud is disposed within the sleeve passage such that a portion of the first alignment finger and a portion of the second alignment finger extend out of the sleeve passage.

18. The optical connection system of claim 7, wherein the optical receptacle assembly comprises at least one bias member disposed between at least one tab of the adapter housing and a wall of the receptacle housing such that the at least one bias member biases the adapter housing within the receptacle housing.

19. The optical connection system of claim 7, wherein the first receptacle optical connector is removably disposed within the first connector opening by a first locking tab and the second receptacle optical connector is removably disposed within the second connector opening by a second locking tab.

20. The optical connection system of claim 7, wherein:
the receptacle housing comprises a flange portion and an inner notch within the flange portion;
the adapter sleeve comprises a circumferential groove and a sealing member within the circumferential groove; and
the circumferential groove of the adapter sleeve is disposed within the inner notch of the flange portion of the receptacle housing.

21. The optical connection system of claim 7, wherein:
the shroud further comprises a first alignment finger and a second alignment finger;
the adapter housing comprises a ledge portion extending from a shoulder portion; and
one of the first alignment finger and the second alignment finger is adjacent the ledge portion when the optical plug connector assembly is mated to the optical receptacle assembly.

22. The optical connection system of claim 7, further comprising a boot coupled to the shroud such that the boot is at least partially disposed within the coupling nut passage.

23. An optical connector assembly comprising:
a connector housing, wherein the connector housing defines a passage and an opening;
an adapter housing disposed within the passage, the adapter housing comprising a first connector opening and a second connector opening, and wherein the adapter housing comprises a pair of opposing central protruding portions each operable to receive an optical connector;
at least one bias member disposed between at least one tab of the adapter housing and a surface of the connector housing such that the at least one bias member biases the adapter housing within the connector housing forward toward the opening of the connector housing and enables the adapter housing to translate back away from the opening of the connector housing during connector mating; and a first cable optical connector and a second cable optical connector, wherein the first cable optical connector is disposed within the first connector opening of the adapter housing and the second cable optical connector is disposed within the second connector opening of the adapter housing.

24. The optical connector assembly of claim 23, further comprising a boot coupled to an end of the connector housing.

\* \* \* \* \*